Figure 1:
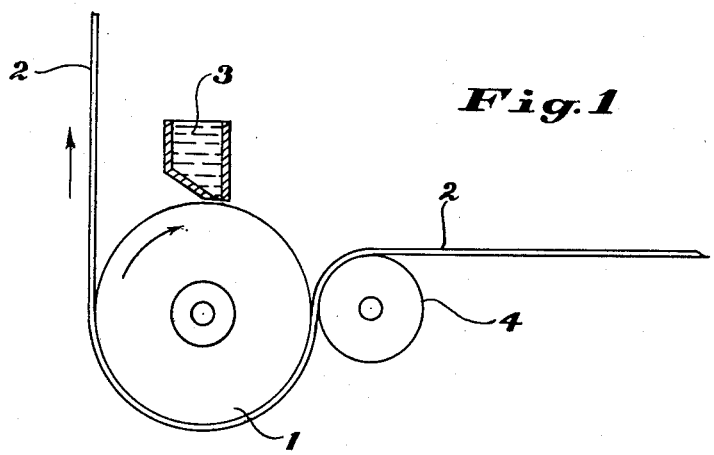
Figure 2:
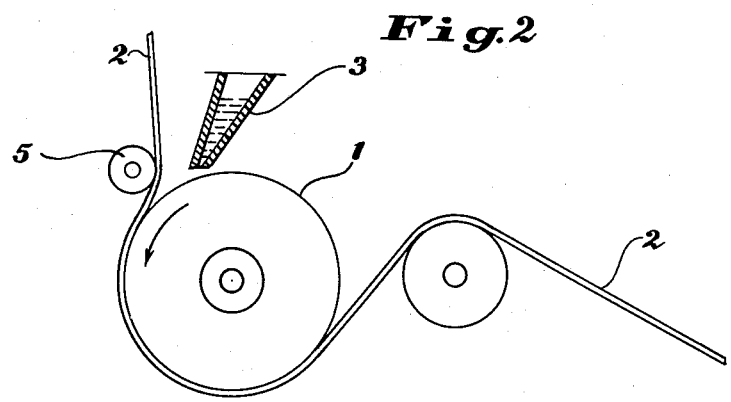

William H. Griggs
Henry C. Staehle
INVENTORS

July 24, 1956 W. H. GRIGGS ET AL 2,756,150
LIGHT SENSITIVE PHOTOGRAPHIC PAPER AND
METHOD FOR ITS PRODUCTION
Filed Nov. 8, 1954 4 Sheets-Sheet 2

William H. Griggs
Henry C. Staehle
INVENTORS

BY
ATTORNEYS

July 24, 1956  W. H. GRIGGS ET AL  2,756,150
LIGHT SENSITIVE PHOTOGRAPHIC PAPER AND
METHOD FOR ITS PRODUCTION
Filed Nov. 8, 1954  4 Sheets-Sheet 3
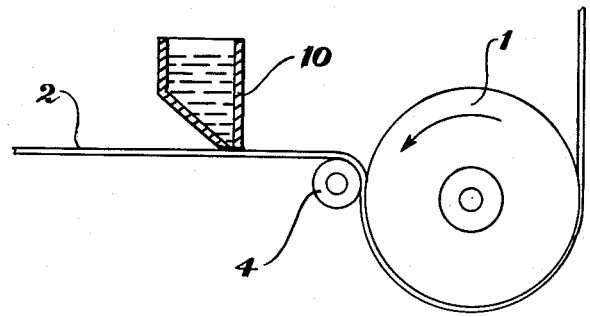
Fig. 7
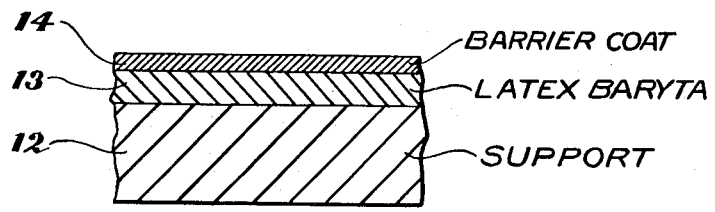
Fig. 8
Fig. 9
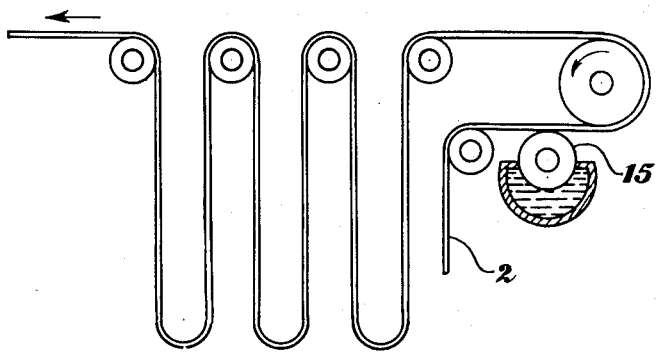
William H. Griggs
Henry C. Staehle
INVENTORS
BY
ATTORNEYS

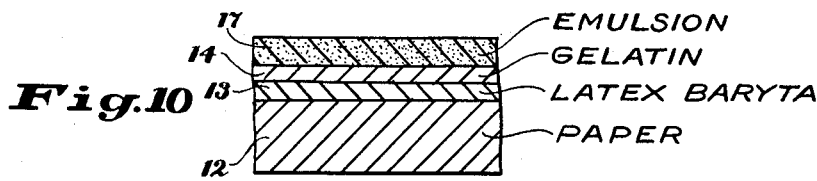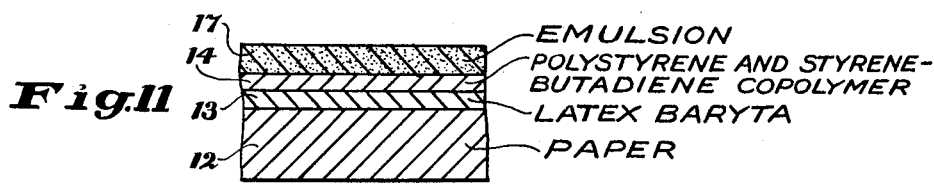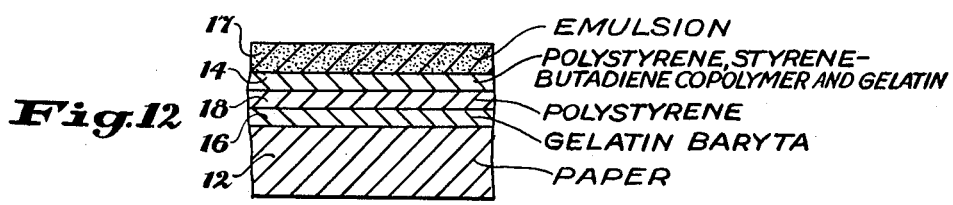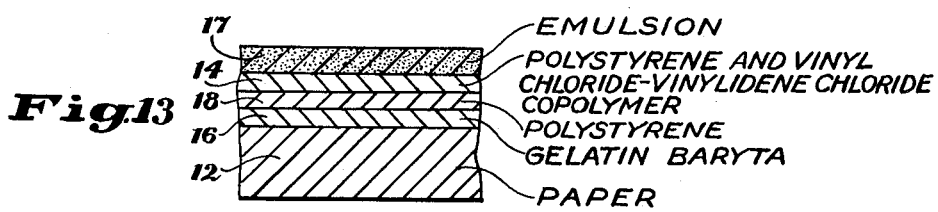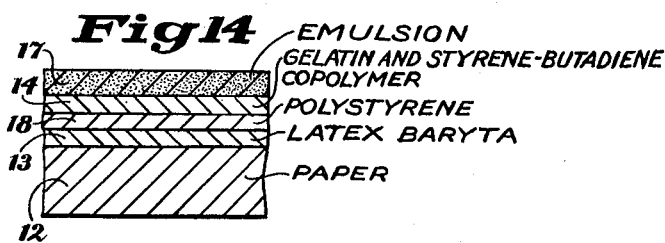

United States Patent Office 2,756,150
Patented July 24, 1956

2,756,150

LIGHT SENSITIVE PHOTOGRAPHIC PAPER AND METHOD FOR ITS PRODUCTION

William H. Griggs and Henry C. Staehle, Rochester, N. Y., assignors to Eastman Kodak Company, Rochester, N. Y., a corporation of New Jersey Application November 8, 1954, Serial No. 467,394

10 Claims. (Cl. 95—8)

This invention relates to the coating of paper and more particularly to a method of providing a barrier layer over photographic paper having a baryta coating thereon.

Various methods of providing paper with a baryta latex surface are known such as that shown by U. S. 2,685,538, issued August 3, 1954, to Stinchfield et al., and U. S. Patent No. 2,537,114, issued January 9, 1951, to Young et al. The use of a resin latex in conjunction with baryta as a coating has many advantages such as improved flexibility, good wet strength, and decrease in curl. However, differences can be detected between photographic papers which have been coated with latex baryta as compared with those coated with gelatin baryta. For instance, migration of silver halide may occur, or a gelatinous emulsion may not adhere to the latex coating.

It is believed that gelatin completely surrounds each pigment particle when it is used as a binder, whereas resin latex, being formed of discrete particles itself, fails to have the same surrounding or covering capacity and, therefore, forms a coating on drying in which each pigment particle is not completely encased. Consequently, when a photographic emulsion is superimposed over the latex baryta layer, it appears possible for the silver halide to migrate into the latex and in some instances to become sensitized. This results in black spots which, of course, are objectionable in photographic prints.

Photographic papers coated with a light-sensitive photographic emulsion are usually processed by immersing in developing and fixing solutions. In order to withstand this wet processing, there must be good adhesion between the emulsion and the paper. However, gelatinous photographic emulsions do not usually adhere at all to compositions containing more than 60% latex.

For some specified purposes, it is desirable to rapidly process photographic paper in cycles of 20-60 seconds. A waterproof barrier coating may be placed over the baryta coated paper in order to prevent processing chemicals from penetrating into the paper base since these processing chemicals cannot usually be washed out in the very short (10-15 seconds) washing cycle used. If the hypo and other chemicals are permitted to remain in the paper base, the prints bleach and stain in a very short time. However, when a completely waterproof base is formed, other problems may develop such as the difficulty in causing the photographic emulsion to adhere to the waterproof barrier layer or the difficulty in providing a glossy surface by ferrotyping. When the wet emulsion comes in contact with a heated ferrotyping drying drum, water caught in the paper base changes to steam, but this steam cannot escape through the waterproof barrier layer. As a result, the steam escapes between the emulsion and the drum causing very spotty sheen and poor appearance. If this condition is alleviated by slowing the drying rate to several minutes instead of seconds, this prolonged drying defeats the whole purpose of rapid processing.

In standard photographic paper manufacture, the paper coated with a gelatin-barrier layer is often calendered to provide a smooth surface. A glossy surface, if desired, is provided by the photofinisher who dries the paper in contact with a highly polished ferrotyping drum.

We have discovered a process for providing a rapid processing water barrier coating system and for providing latex baryta paper with a barrier coating which prevents silver halide from migrating into the pigment layer. Both of these barrier coatings afford surfaces which are compatible with photographic emulsions and to which the gelatinous photographic emulsion readily adheres. Moreover, the migration barrier coat may also provide a glossy surface rendering ferrotyping unnecessary. For rapid processing, we have discovered a rapid processing barrier coating which permits rapid processing by preventing the penetration of processing chemicals into the paper base and at the same time permits steam to escape from the paper as the paper is ferrotyped against a ferrotype drying drum.

One object of this invention is to provide a photographic paper on which can be coated a photographic emulsion without the likelihood of black spots appearing due to migration of the silver halide particles. Another object is to provide a surface over latex baryta paper to which gelatinous photographic emulsions will adhere. A further object is to provide a method of glossing paper with a gelatin-resin latex coating compatible with photographic emulsions. A further object is to provide a glossy photographic paper which does not require ferrotyping. A still further object is to provide a photographic paper having a glossy surface which withstands wetting during photographic processing. Another object is to provide a rapid processing barrier layer for photographic paper which permits rapid processing of the paper and at the same time permits steam to escape through the barrier layer. An additional object is to provide a rapid processing photographic paper which can be ferrotyped and which provides a surface to which photographic emulsions will adhere.

The above objects are obtained by coating a baryta coated paper with a migration barrier coating containing a resin latex. In order to provide a glossy surface on the paper, a migration barrier coating comprising gelatin and a styrene-butadiene resin latex is coated on the paper, contacted against a glossy, highly polished drum, calender roll or endless belt heated to approximately 160° F. until the coating is substantially nonplastic, at which time the paper may be stripped from the polished surface. In our preferred embodiment of this feature of our invention, we use an aqueous gelatin-latex composition containing approximately from 40–60% gelatin by weight, dry basis, and approximately from 60–40% by weight, dry basis, of a styrene butadiene (60:40) resin latex formed by emulsion polymerization according to the process disclosed in U. S. Patent 2,537,114, issued to Young et al.

In order to provide a rapid processing photographic paper, the baryta coated paper is coated with a polystyrene resin dispersion of from about 1.5-3 grams per square meter, dry basis, and heat treated at a temperature of 275–320° F. The surface is then coated with 1.5-3 grams per square meter coating of a composition containing polystyrene, styrene-butadiene copolymer, gelatin and water, or a coating composition containing a polystyrene, vinyl chloride-vinylidene chloride copolymer and gelatin. The resins are formed by emulsion polymerization and are dispersions in water.

In the event that the glazing process is used following coating of the migration barrier coating, it may be desirable to incorporate a stripping agent in the coating selected from soapy components such as ammonium oleate, sodium stearate and the like.

The method of glazing the migration barrier coating will be better understood by reference to the accompanying drawing in which Figs. 1–7 and 9 are diagrammatic figures illustrating various methods of carrying out our process.

Figs. 8 and 10–14 illustrate paper sections showing the surface layers.

Figure 3:
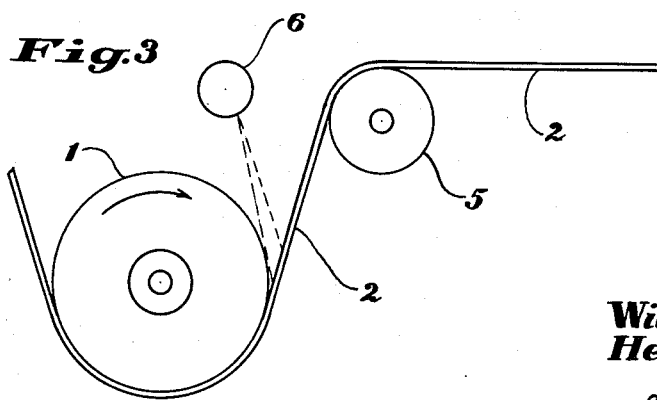
Figure 4:
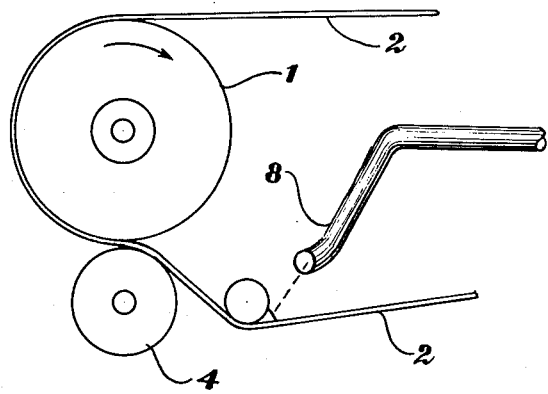
Figure 5:
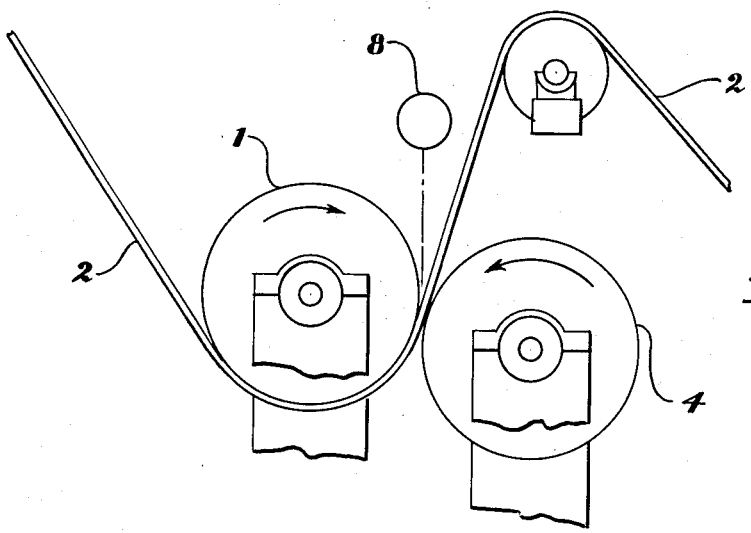
Figure 6:
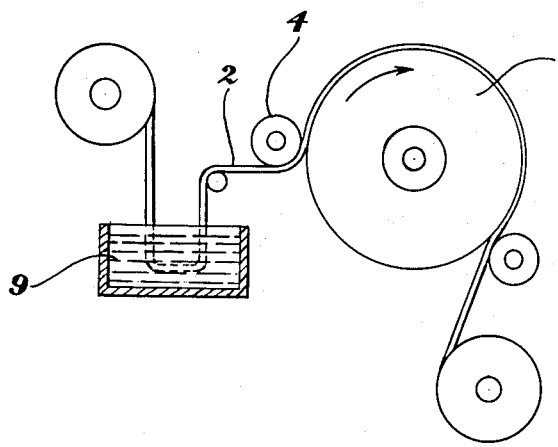

Referring to the drawings in Figs. 1–7, the paper 2 is led by suitable means past a coating apparatus such as a spray 6 in Fig. 3, a pierced tube 8 in Figs. 4 and 5, a dip bath 9 in Fig. 6 or a coating hopper 10 in Fig. 7. The coating may also be applied from a hopper 3 to the polished drum in Figs. 1 and 2 and in this way, be transferred to the paper surface. The coated paper is contacted against a polished drum 1 until it is rendered substantially non-plastic, after which the paper is removed therefrom. Various other methods of applying the coating to paper may be used such as wick coating, contacting against a dip roller and the like. Also various ways of maintaining tension of the paper against the polishing drum may be used including a press roll 4, in Figs. 1 and 4–7 and a tension roll 5 in Figs. 2 and 3.

Referring to Fig. 8, the paper section comprises the paper support 12 on which has been coated a latex baryta layer 13, which is then air dried. Following this step, a migration barrier coat 14 is applied which may be glazed using the method shown in Figs. 1–7 in which a gelatin-latex coating comprising styrene-butadiene and gelatin is cast coated on the paper. Fig. 9 shows a method which may be used for coating the paper when a glossy coating is not desired. The paper 2 is led past a dip roller 15 which applies the coating to the paper. Drying is attained by hanging in festoons in a warm room. Other known methods of coating or drying the paper may also be used.

Fig. 10 shows a paper base 12 with a latex baryta coating 13 followed by a gelatin migration barrier coating 14 and a light-sensitive photographic emulsion 17.

Fig. 11 shows a paper base 12 having a latex baryta layer 13, a polystyrene and styrene-butadiene copolymer containing layer 14 and a light-sensitive photographic emulsion 17.

Fig. 12 shows a paper base 12 carrying a gelatin baryta layer 16, a discontinuous polystyrene layer 18, a polystyrene, styrene-butadient copolymer and gelatin containing layer 14 and a photographic emulsion 17.

Fig. 13 shows a paper 12 with a gelatin baryta layer 16, a discontinuous rapid processing polystyrene layer 18, a polystyrene, vinyl chloride-vinylidene chloride copolymer containing layer 14 and a photographic emulsion 17.

Fig. 14 shows a paper base 12 containing a latex baryta layer 13, a polystyrene rapid processing layer 18, a gelatin and styrene-butadiene copolymer migration barrier layer 14 and a photographic emulsion 17.

The invention will be further illustrated, but is not limited by the following examples in which the quantities are stated by weight unless otherwise indicated:

*Example I.*—A roll of 27 pounds per 1,000 square feet paper base was coated with a 50 grams per square meter coat of latex baryta having the following composition:

| | |
|---|---|
| Blanc fixe | 1,000 grams dry solids. |
| Styrene-butadiene (60:40) resin in water | 75 grams dry solids. |
| Gelatin | 25 grams dry solids. |
| Water | To desired solids. |

The blanc fixe was formed by barium carbonate precipitation. This coating was dried, heat treated at 300–320° F. for 5–10 seconds and calendered. A three grams per square meter size coating of the following composition was then applied to part of the stock.

| | |
|---|---|
| Gelatin | 100 grams. |
| Water | To desired solids. |

Both the sized and unsized portions of the latex baryta paper were sensitized with fine grain silver halide photographic emulsion. After only a few days of natural aging, the unsized portion showed black spots upon normal photographing processing. After 16 days' incubation at 120° F., and 35% relative humidity, the sized portion showed no black spots even with development under exaggerated conditions (5 minutes, 90° F.). The photographic emulsion showed good adherence to the sized portion during processing but relatively poor adherence to the unsized portion.

*Example II.*—The same latex baryta coating described in Example I was coated 3 grams per square meter with the following composition:

| | |
|---|---|
| Gelatin | 40 grams dry weight. |
| Styrene-butadiene resin latex (60:40) | 60 grams dry weight. |
| Water | To 30% solids. |

The results were the same as in Example I.

*Example III.*—Same latex baryta coating was used as in Example I, and the same size coating as in Example I, but the coated paper was contacted while wet against a highly polished drum heated to a temperature of 90–100° F. to provide a glossy surface.

*Example IV.*—Same coatings as were used in Example II, but the size coating weight was about 6 grams per square meter. The wet coating was contacted for about 2 minutes against a polished coated drum heated to a temperature of 90–100° F.

The gloss reading on the 75° Gardiner Gloss Meter was 91 as compared to 51 for the same coating applied on the same paper using conventional air drying.

*Example V.*—Same as Example I except the following size coating composition was used:

| | |
|---|---|
| Styrene-butadiene resin (60:40) | 47.5 solids weight. |
| Polystyrene latex | 52.5 solids weight. |
| Water | To 30% solids. |

The above was coated using the glazing wheel heated to a temperature of 90–100° F. and produced a glossy coating which stood up well under emulsion coating.

*Example VI.*—Same as Example I, II, III, and IV except the solids were varied from 15–35%. These variations produced satisfactory coatings.

*Example VII.*—Same as Example I–V except the following additions were made to the migration barrier coating mixtures:

| | |
|---|---|
| Ammonium oleate | 2 grams per 100 grams solids. |
| or | |
| Sodium stearate | 2 grams per 100 grams solids. |
| or | |
| Triton N–100 (aryl alkyl polyether alcohol) | 0.3 gram per 100 grams solids. |

The additions improved the release qualities of the paper from the polished drum when the glossing method was used.

*Example VIII.*—Same as Examples III, IV, V, VI, and VII except that the temperature of the drum was increased to 160° F. with a contact time correspondingly reduced to 45–60° seconds.

*Example IX.*—A roll of photographic paper stock, 27 pounds per 1,000 square meters was coated with two coats of 28 grams per square meter of gelatin-baryta. This coating was dried and then coated with a coat of 1.5 grams per square meter of a polystyrene resin dispersion, dried and heat treated with infrared heat for 5–10 seconds at 275–320° F., paper surface temperature. An additional coating having the following composition:

| | |
|---|---|
| Polystyrene resin dispersion | 31.50 grams solids. |
| Styrene-butadiene copolymer (60:40) resin latex | 20.50 grams solids. |
| Gelatin | 40.0 grams solids. |
| Water | To desired solids. |

This was also heat treated at 275°–320° F. The coating was sensitized with a photographic emulsion and compared with a completely waterproof paper and with a paper having no barrier layer, all of which were coated with the same light-sensitive photographic emulsion. After processing, the prints were dried with the coated side against a ferrotype drum. The paper with the barrier layer processed satisfactorily as did the paper without a barrier layer, but the completely waterproof paper showed very poor ferrotyping with many dull spots and streaks.

Three samples of the above papers were placed in an incubator at 120° F. and 35% relative humidity and were examined at intervals of 2, 4, 6, 8, 10, and 12 days. After two days the paper without a barrier layer showed slight evidence of bleach and stain. After four days this sample was considerably bleached and stained. After 12 days the paper having the barrier layer and the waterproof stock showed only slight stain in bleaching and showed considerably better appearance than the paper with no barrier layer had shown at two days.

*Example X.*—A baryta coated paper the same as that used in Example IX was coated with three grams per square meter of a polystyrene resin dispersion instead of 1.5 grams per square meter. Similar tests of ferrotyping and incobation showed that the 3 grams per square meter sample also gave improved results over the two control samples.

*Example XI.*—Photographic papers were coated with baryta as described in Examples IX and X with the exception that a vinyl chloride-vinylidene copolymer dispersion was substituted for the styrene-butadiene resin latex. The vinyl chloride-vinylidene chloride copolymer dispersion is formed by emulsion polymerization in water having particles averaging 0.2–0.3 micron in size and containing about 50% solids.

Examples 9–11 indicated that water resistance comparable to complete waterproof paper for rapid surface processing was provided by these barrier coatings and yet gave coatings having ferrotyping qualities comparable to regular non-water resistant baryta coated comparisons.

The polystyrene resin latex is a dispersion in water at about 30% solids. The styrene-butadiene (60% styrene) resin is dispersed in water at about 48% solids. The chloride-vinylidene chloride copolymer contains about 70–90% polyvinyl chloride. It is dispersed in water at about 45.55% solids.

Partial fusion of the resin particles is necessary in order to bind the particles to the baryta and to themselves. However, complete fusion is not feasible since a temperature of 500°–600° F. is necessary, and it is believed that complete fusion is undesirable since complete fusion of these coatings using a chemical plasticizer produce coatings which would not ferrotype properly.

In providing a glossy surface, we have found that our barrier coat may be used over gelatin-baryta coatings as well as over coatings containing a resin. The solids content may range from 10–35% of the coating composition, and the temperature of the drum when the glossy surface is produced may range from about 95° to about 160° F. In addition the baryta coating weight may be varied from 20–58 grams per square meter.

Using our process, latex baryta photographic paper may be provided with a size coating which effectively protects photographic emulsion from migrating effects. In addition, our size coating may provide a glossy surface for the sensitized paper, enabling the photofinisher to supply the public with glossy paper without the need of ferrotyping. It will be understood that various other embodiments of our invention are also within its scope such as the use of a continuous belt or a calendered roller for glazing the paper instead of a polished drum. In addition, other compositions may be used as release agents applied both to the drum or incorporated in the coating composition.

When our barrier coatings are used for the purpose of providing rapid process photographic paper, we find that our paper has the property of waterproof paper in that it prevents the penetration of processing chemicals into the paper base and at the same time provides a layer which will permit steam to escape so that the paper may be ferrotyped to provide a glossy surface.

The expression, rapid processing barrier layer, is used herein to describe a polystyrene resin latex of 1.5–3 grams per square meter coated over a photographic paper base which has first been coated with a baryta-adhesive coating.

The expression, migration barrier coating, is used herein to describe a coating placed over a latex-baryta layer coated on photographic paper base in order to prevent the migration of silver halide grains from the photographic emulsion into the baryta layer. It is also used herein to describe the coating which is used to put a glossy coating over the baryta layer prior to coating with a photographic emulsion. When used as a glossing coating, this composition may be coated over an ordinary baryta-adhesive layer in which the adhesive may be gelatin or the like.

We claim:

1. A photographic paper having a glossy surface comprising a photographic paper base containing thereon a first coating comprising a styrene-butadiene resin latex and baryta, a second coating comprising styrene-butadiene latex and gelatin, which coating is dried to a substantially non-plastic condition in contact with a highly polished casting surface and a third coating comprising a light-sensitive silver halide emulsion.

2. A photographic paper as described in claim 1 wherein the styrene-butadiene latex contains a copolymer produced by polymerizing a monomeric mixture containing about 60% by weight of styrene and about 40% by weight of butadiene.

3. A process for providing a glossy photographic paper comprising applying onto the paper base a first coating comprising baryta and adhesive, a second coating containing gelatin and a styrene-butadiene resin latex, pressing the coated side of the paper while the coating is still wet against a highly polished casting surface until the coating is dried to a substantially non-plastic condition and applying a third coating comprising a light-sensitive silver halide emulsion.

4. A process for providing a photographic paper containing a silver halide migration barrier coating, comprising applying to the paper base a first coating containing a mineral pigment and a styrene-butadiene resin latex, drying, applying a second coat containing gelatin and a styrene-butadiene resin latex, and coating with a light-sensitive silver halide emulsion.

5. A process as described in claim 4 in which the second coating contains 40 to 60% gelatin by weight, dry basis and at least 39% by weight dry basis of a styrene-butadiene resin latex formed by an emulsion polymerization and containing about 40% by weight butadiene and about 60% by weight styrene.

6. A process for providing a glossy photographic paper comprising coating the paper with a first coat comprising baryta and a styrene-butadiene resin latex, drying, heat treating at a temperature between 300–320° F., coating with a migration barrier coating containing from 40 to 60% gelatin by weight, dry basis, at least 39% by weight, dry basis, of a styrene-butadiene resin latex and about 1% by weight, dry basis, ammonium oleate, pressing the coated side of the paper while the coating is still wet against a highly polished casting surface and drying in contact with the casting surface until the coating is substantially non-plastic, removing the paper from the casting surface, and coating with a light-sensitive silver halide emulsion.

7. A photographic paper for rapid processing comprising a paper base containing thereon a first coating comprising a mineral filler and an adhesive, a second coating comprising 1.5-3 grams per square meter of polystyrene, a third coating comprising polystyrene, styrene-butadiene resin and gelatin, and a fourth coating comprising a light-sensitive silver halide emulsion.

8. A photographic paper for rapid processing comprising a paper base containing thereon a first layer comprising a mineral filler and an adhesive, a second layer comprising 1.5-3 grams per square meter of polystyrene, a third layer comprising polystyrene, vinyl chloride-vinylidene chloride copolymer and gelatin, and a fourth layer comprising a light-sensitive silver halide emulsion.

9. A process for providing a photographic paper for rapid processing comprising coating the paper base with a baryta-adhesive coating, coating the paper with a 1.5-3 grams per square meter, solids basis, with a polystyrene resin latex, heat treating for 5-10 seconds at 275–320° F., coating with a composition containing polystyrene resin latex, styrene-butadiene resin latex and at least 40% gelatin, heat treating at a temperature of 275–320° F. and coating with a light-sensitive silver halide emulsion.

10. A photographic paper comprising a paper base containing thereon a first coating comprising baryta and a styrene-butadiene resin latex, a second coating comprising 1.5-3 grams per square meter of polystyrene, a third coating comprising a migration barrier layer comprising gelatin and styrene-butadiene copolymer and a fourth coating comprising a light-sensitive silver halide photographic emulsion.

References Cited in the file of this patent

UNITED STATES PATENTS

| | | |
|---|---|---|
| 2,360,216 | Fillius | Oct. 10, 1944 |
| 2,698,235 | Swindells | Dec. 28, 1954 |

FOREIGN PATENTS

| | | |
|---|---|---|
| 562,666 | Great Britain | July 11, 1944 |
| 634,550 | Great Britain | Mar. 22, 1950 |
| 696,496 | Great Britain | Sept. 2, 1953 |

OTHER REFERENCES

"Styrene" by Boundy-Boyer; published by Reinhold Publishing Co., New York, 1952; pages 857–860.